United States Patent [19]

Syme

[11] 4,279,238

[45] Jul. 21, 1981

[54] WOOD BURNING HEATING APPARATUS

[75] Inventor: Duncan C. Syme, Chelsea, Vt.

[73] Assignee: Vermont Castings, Inc., Randolph, Vt.

[21] Appl. No.: 86,673

[22] Filed: Oct. 19, 1979

[51] Int. Cl.³ .............................................. F24C 1/14
[52] U.S. Cl. ....................................... 126/77; 126/66; 126/75; 126/289
[58] Field of Search ................. 126/58, 65, 79, 67, 126/80, 75, 76, 77, 288, 289, 146, 193, 198, 290

[56] References Cited

U.S. PATENT DOCUMENTS

| | | | |
|---|---|---|---|
| 2,174,347 | 9/1939 | Card | 126/77 |
| 2,393,855 | 1/1946 | Cheasley | 126/146 |
| 4,154,212 | 5/1979 | Wilkinson | 126/77 |
| 4,177,791 | 12/1979 | Marchant | 126/77 |
| 4,180,052 | 12/1979 | Henderson | 126/75 |
| 4,192,285 | 3/1980 | Nietupski | 126/75 |

OTHER PUBLICATIONS

Operation Manual for the Defiant and Vigilant Woodburning Stoves, Copyright 1979, Vermont Castings, Inc.

Operation Manual for Defiant Parlor Stove, Copyright 1976, Vermont Castings, Inc.

Primary Examiner—James C. Yeung
Attorney, Agent, or Firm—Kenway & Jenney

[57] ABSTRACT

A woodburning heating apparatus capable of horizontal and updraft combustion has removable elements positioned within a relatively small enclosed volume to provide efficient and reliable operation in either combustion mode. The removable elements include the wear plates, fireback, and damper assembly. The wear plates and fireback define primary, secondary, and night air supplies for the apparatus. An articulated damper control mechanism provides resistance against impinging combusted gases in at least one position of the damper. The damper construction allows, in either the horizontal or updraft combustion modes, the provision of both top exiting and rear exiting flue connections. Baffles are provided at the combusted gas exit from the primary combustion chamber to uniformly spread the combusted gases exiting the primary chamber over a substantial volume so that localized heating of the apparatus does not occur.

20 Claims, 10 Drawing Figures

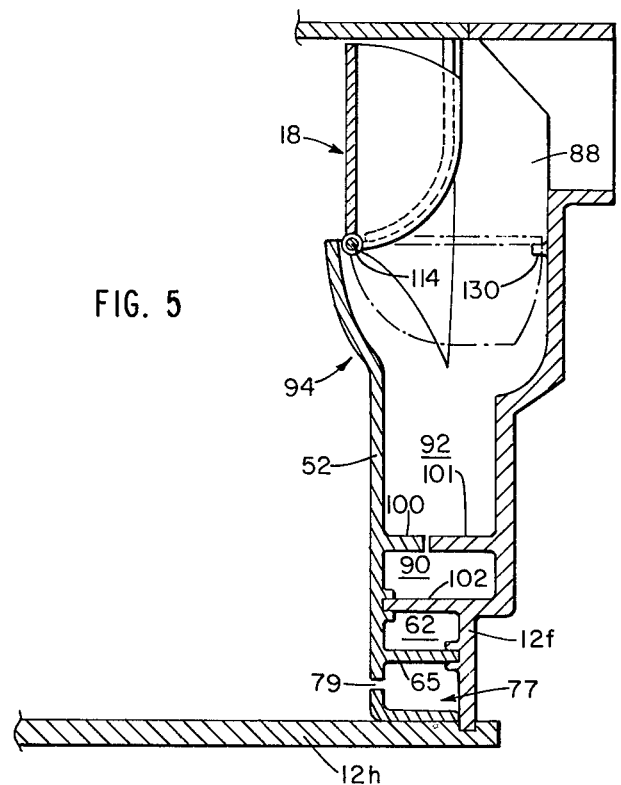
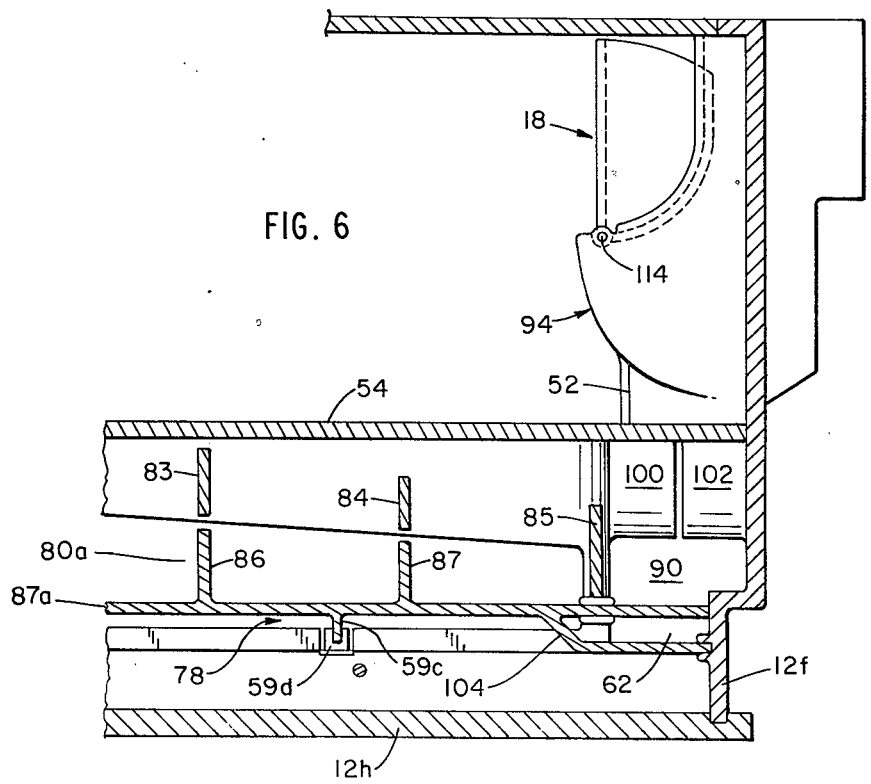

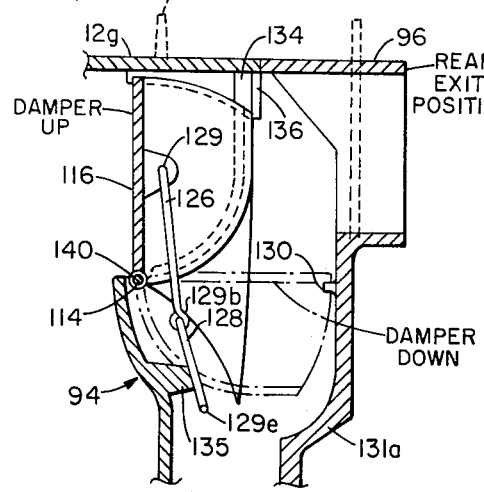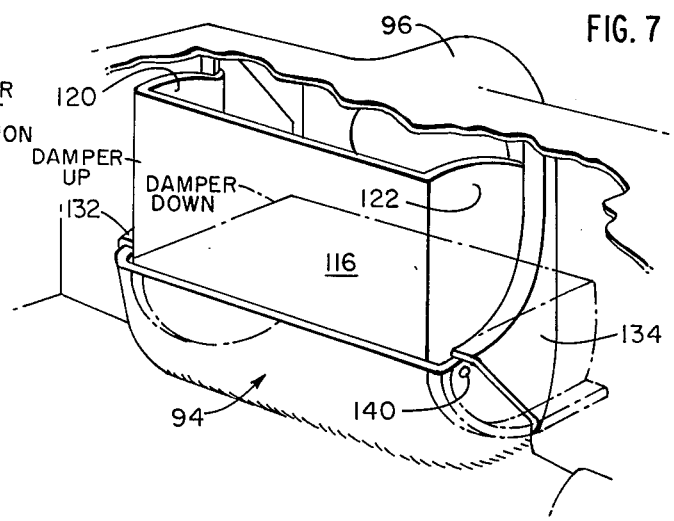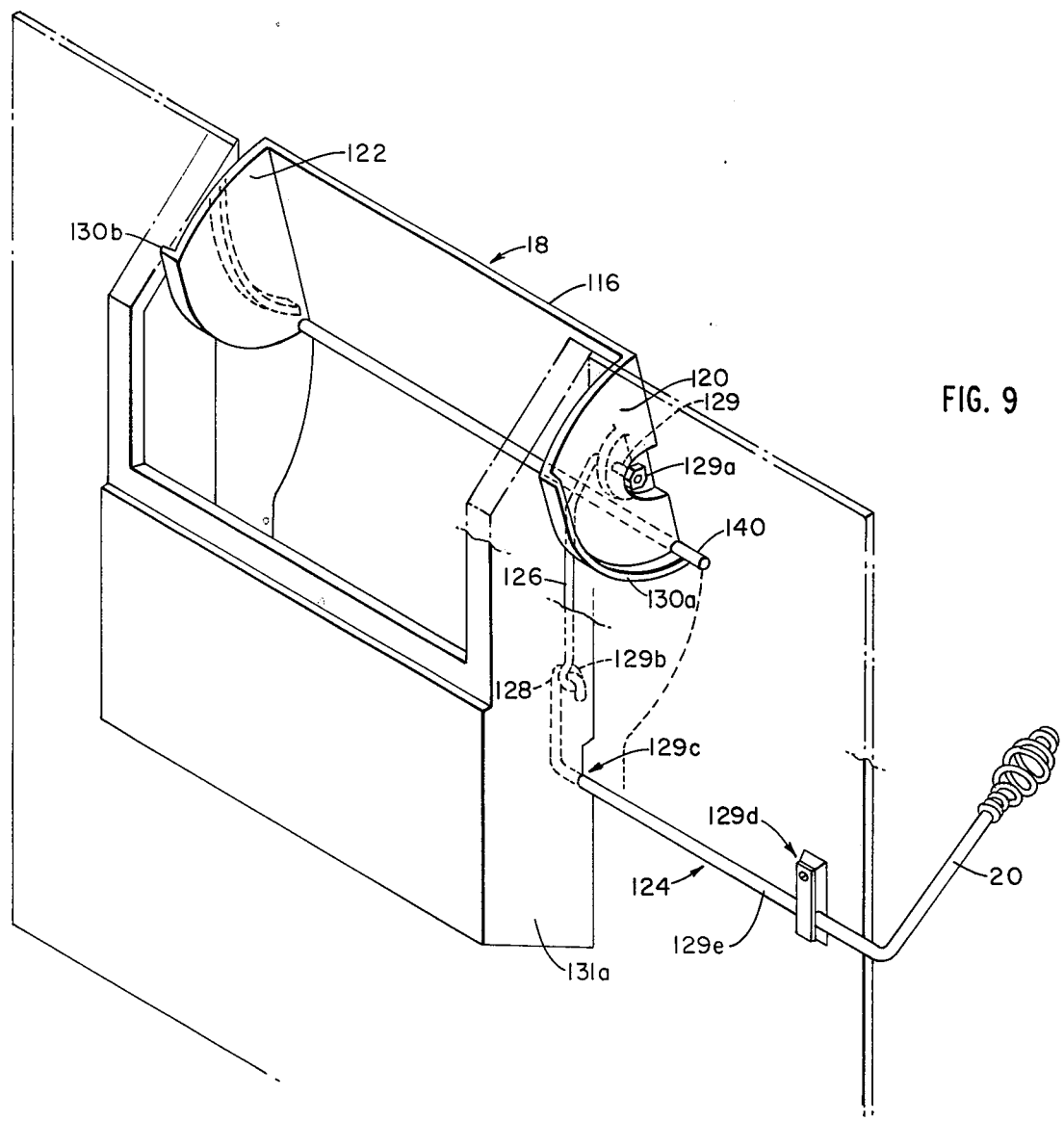

WOOD BURNING HEATING APPARATUS

BACKGROUND OF THE INVENTION

This invention relates generally to a woodburning heating apparatus and in particular to an airtight woodburning heating apparatus employing horizontal combustion.

As the price of oil and gas fuels increases, more and more households are turning to woodburning apparatus to provide at least a portion and in some circumstances all of the heat for a dwelling. In some instances fireplaces are used. However the fireplace is an inefficient heater; and in response to the increased demand for woodburning heating apparatus, a myriad of woodburning stoves have been designed and manufactured.

One class of particularly efficient woodburning stoves are those stoves which have controlled air inlets. These stoves, often termed airtight, can have many different configurations. Two of the airtight stoves which are particularly successful, are capable of operating using horizontal combustion. They are the Vigilant and the Defiant, both manufactured by Vermont Castings, Inc., Randolph, Vt., the assignee of this application. The Vigilant and the Defiant are both relatively large heating apparatus having heat outputs, at maximum burning capacity, of about 45,000 and 55,000 BTU's respectively. This large heat output, while desirable for heating large volumes, clearly can overpower the typical "family room" or "den" in which the stoves are often placed. As a result, it is desirable to produce a smaller version of a horizontal combustion apparatus.

Most practically, one would simply reduce the dimensions of either the Vigilant or the Defiant to produce a stove having a smaller wood capacity, smaller dimensions, and a lower heat output. Unfortunately, however, as the size of the stove is reduced, designs which are satisfactory in a large stove present major problems, because, for example, parts are much closer to one another and to the primary combustion chamber of the apparatus. As a result, it is not acceptable to merely reduce the dimensions of already existing stoves in order to meet the need of a smaller, efficient, long lasting, and reliably made stove.

An object of this invention is therefore a heating apparatus having a reduced maximum heat output, and which is long lasting, reliable, practical and efficient. Other objects of the invention are a heating apparatus wherein the user can service the apparatus, and which can be reliably manufactured with minimum cost.

SUMMARY OF THE INVENTION

The invention relates to a woodburning heating apparatus having a heat conducting frame member with front, back, and side vertical wall panels, a top panel, and a bottom panel, which together, enclose a defined volume. The invention features a plurality of removable wear plates, which define, in combination with the wall panels and a removable fireback, a primary air supply path and a long circuitous internal flame path. In the illustrated embodiment, the wear plates are supported by the bottom panel.

The primary air supply path has a first enclosed elongated path for supplying air at a first side of the apparatus to a primary combustion chamber. The long flame path circuitously extends from the second end side the apparatus substantially between the fireback and at least one wear plate, and the frame member, to the top back portion of the apparatus.

The frame member, and preferably the top panel and a wall panel at the back portion of the apparatus, are adapted to define a flue gas exit aperture for the flame path. The exit aperture preferably enables a flue collar to be attached in either a top exiting or a rear exiting configuration.

The apparatus further features a movable damper which is pivotal about a longitudinal axis for providing in a first position an up draft combustion apparatus and in a second position a horizontal combustion apparatus. A mechanical linkage is provided for moving the damper between the first and second positions. The damper extends less than the full width of the apparatus (looking from the front) and preferably cooperates with the frame member for providing sealing relationships as described below.

In a preferred embodiment, the damper has a first panel member which pivots about a pivot axis between a substantially vertical position and a substantially horizontal position and first and second ear panel members which are integrally connected to the first panel member in a spaced apart configuration and in substantially vertical planes. These ear members pivot about the longitudinal damper pivot axis and substantially remain in their respective vertical planes. The fireback has a cup-shaped forwardly or inwardly protruding section which meets in a sealing engagement with protruding members extending from the back wall. Gaseous flow is thus directed from the flame path toward the exit aperture or opening. The cup-shaped section, the protruding members, the frame member, and the damper, form sealing relationships when the damper is in either the first or the second position.

Preferably, the protruding members each have cutaway side portions for providing more complete gaseous removal from upper back corners of the heating apparatus when the damper is in its first position. In any case, the damper is preferably removable from the apparatus as are the wear plates so that if they wear out they can be easily and conveniently replaced by the user. The damper is preferably moved between its first to second positions by an articulated linkage which provides a mechanical resistance against movement of the damper as a result of impinging combusted gases in at least the second position of the damper.

BRIEF DESCRIPTION OF THE DRAWINGS

Other objects, features, and advantages of the invention will be apparent from the following description of a preferred embodiment taken together with the drawings in which:

FIG. 5 is a cross-sectional view along the lines 5—5 of FIG. 4;

FIG. 6 is a cross-sectional view along lines 6—6 of FIG. 4;

FIG. 7 is a perspective detail view of the damper structure;

FIG. 8 is an end cross-sectional view of the damper-frame structure; and

FIG. 9 is a detailed perspective, partially schematic, view of the damper-handle linkage according to the invention.

DESCRIPTION OF A PREFERRED EMBODIMENT

Figure 1:
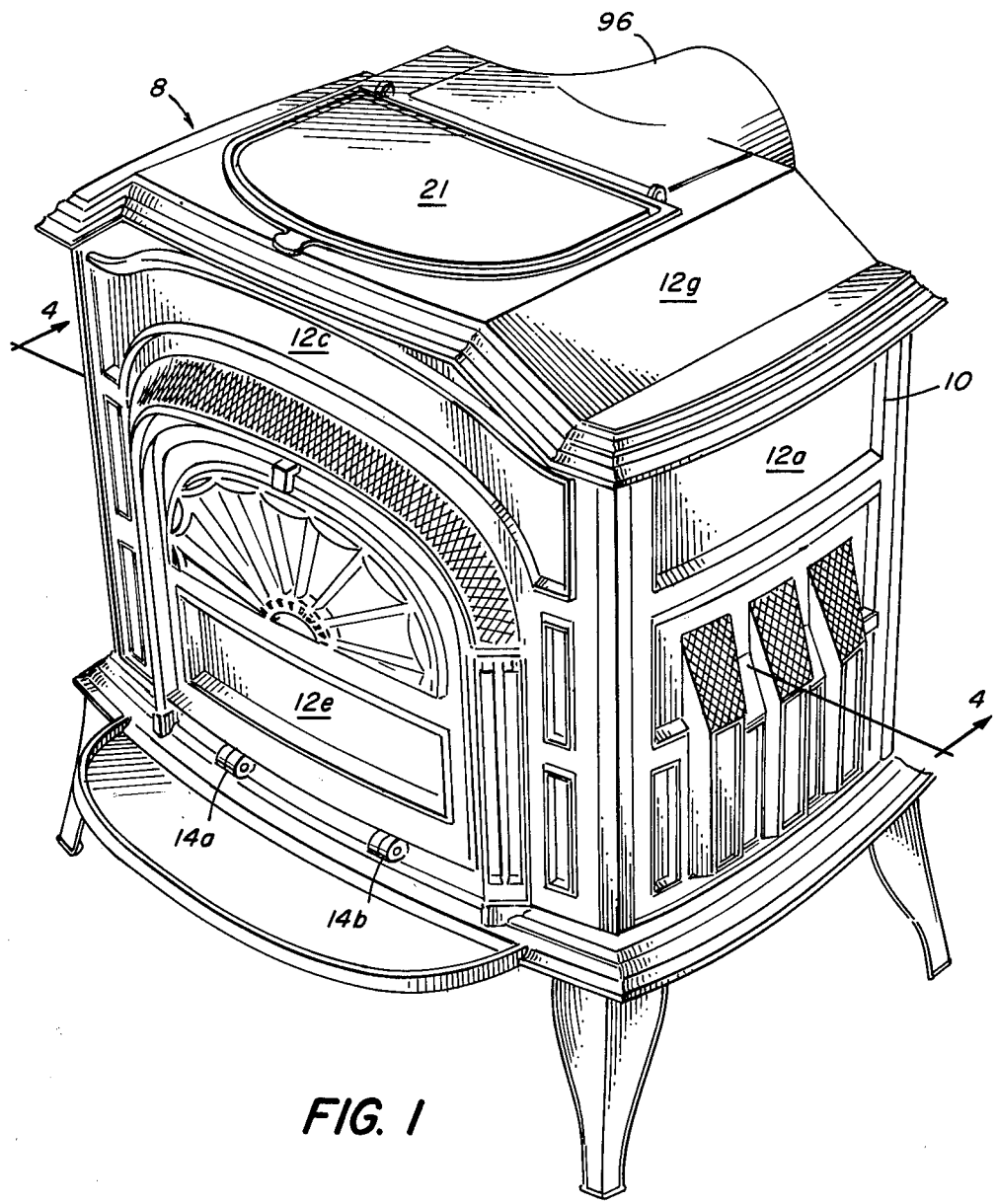
FIG. 1 is a front perspective view of a preferred embodiment of a heating apparatus according to the invention.
Figure 2:
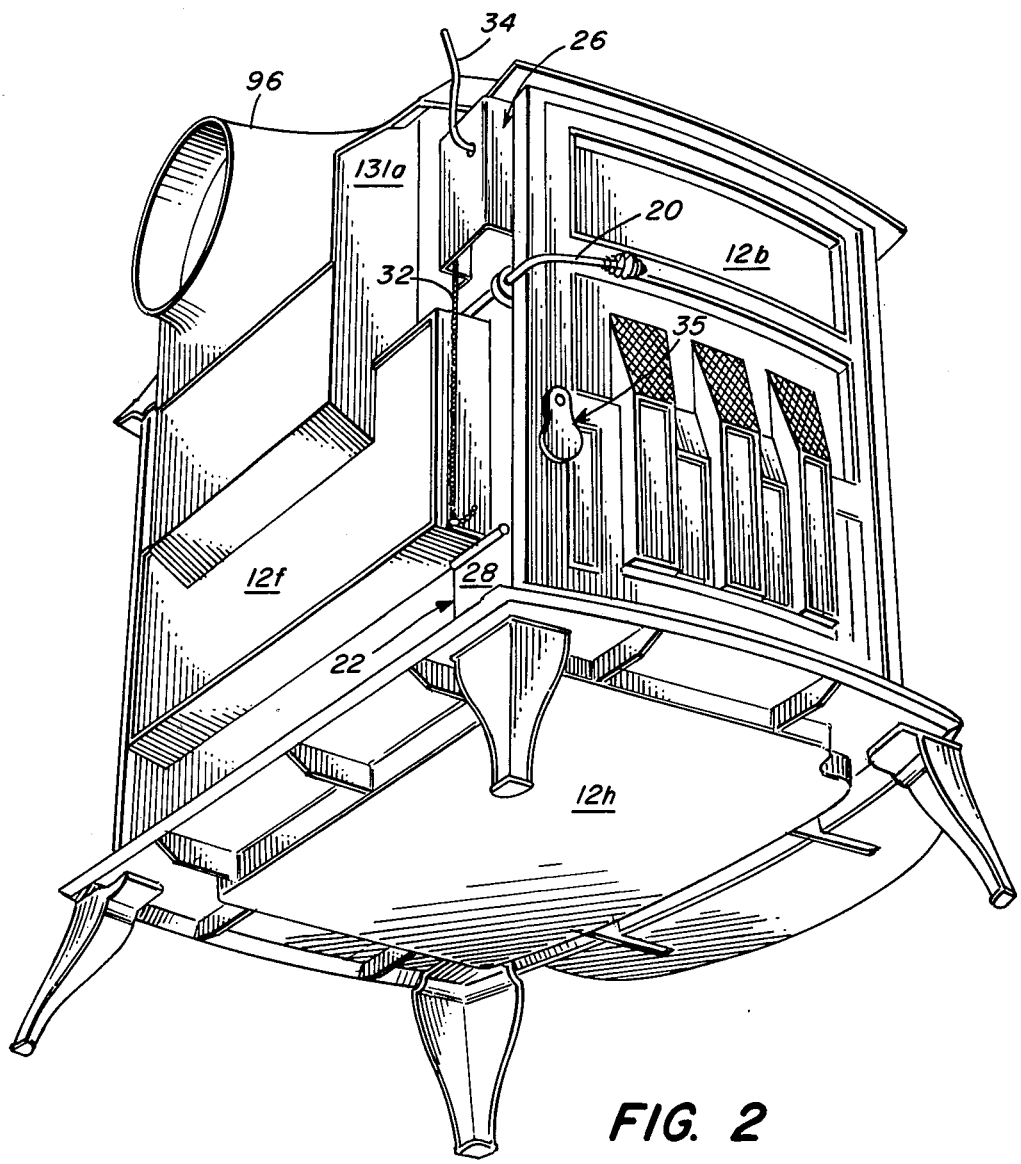
FIG. 2 is a rear perspective view of the preferred embodiment of the heating apparatus according to the invention.

Referring to FIGS. 1 and 2, a wood-burning heating apparatus 8 has an exterior frame member 10 preferably comprised of a heavy-duty cast iron. The sides 12a, 12b, front 12c with door 12e, back 12f, top 12g, and bottom 12h of the frame member are joined in a channeled construction to form an integral, airtight unit. The front pivoting door 12e, which pivots down on hinges 14a, 14b, allows the heating apparatus to be opened from the front for both loading wood into a primary combustion chamber 16 (FIG. 3) and for viewing the fire when the heating apparatus is used as a fireplace. In its closed position, door 12e seals against a gasketing material such as an inert mineral fiber woven rope sealing member. A damper 18 (FIGS. 3 and 4) whose position is controlled by a handle 20 allows the heating apparatus to be operated in an updraft combustion configuration (like a fireplace) or in a horizontal combustion configuration as described in more detail below. Illustrated top member 12g supports a cast iron cooking surface 21.

Figure 3:
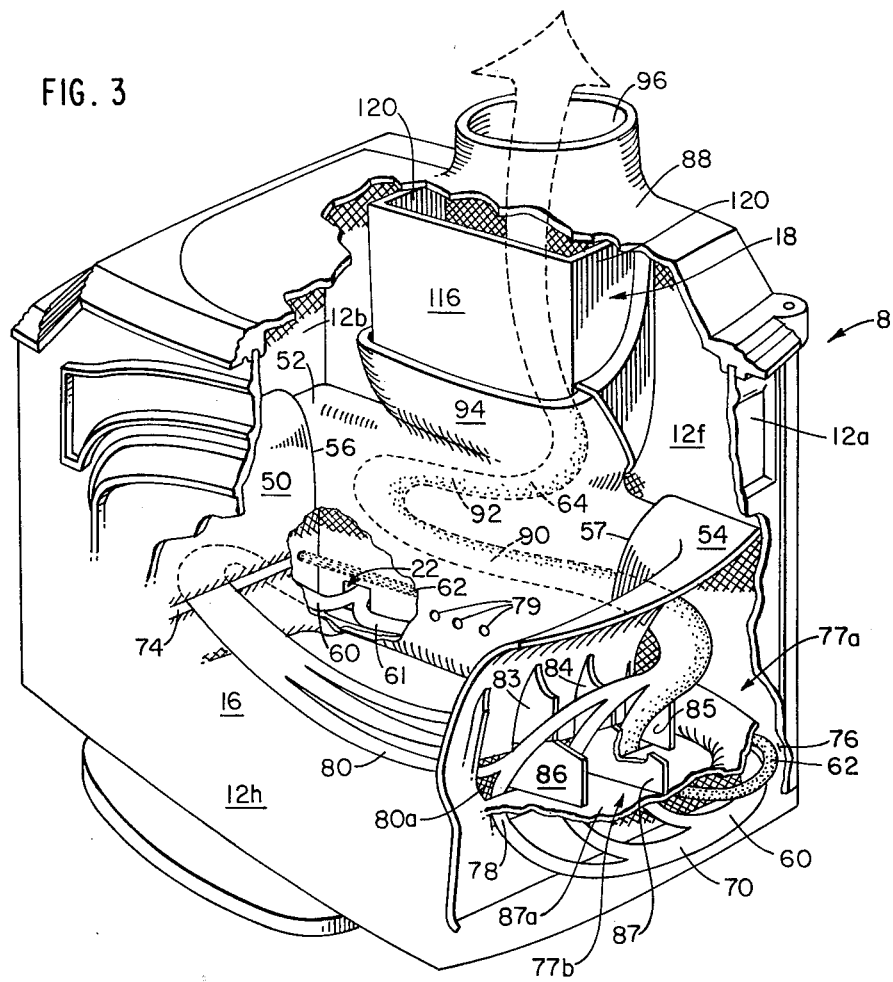
FIG. 3 is a partially cut away, somewhat schematic perspective view of the preferred embodiment of the heating apparatus according to the invention.

Referring to FIGS. 2 and 3, air is supplied to the primary combustion chamber 16, through an inlet port 22 as described in more detail below. Inlet port 22 is thermostatically controlled by a thermostat 26 which operates a pivoting draft shutter 28, removably covering an aperture in the back frame member 12f. Thermostat 26 is for example a coil of bimetallic material connected to shutter 28 by a flexible chain 32. Heating apparatus 8 also has a control lever 34 for regulating thermostat 26. A manually controlled night air inlet port 35 in side member 12b provides the air inlet for air supplied to the primary combustion chamber 16 especially for night or low level operation.

Figure 4:
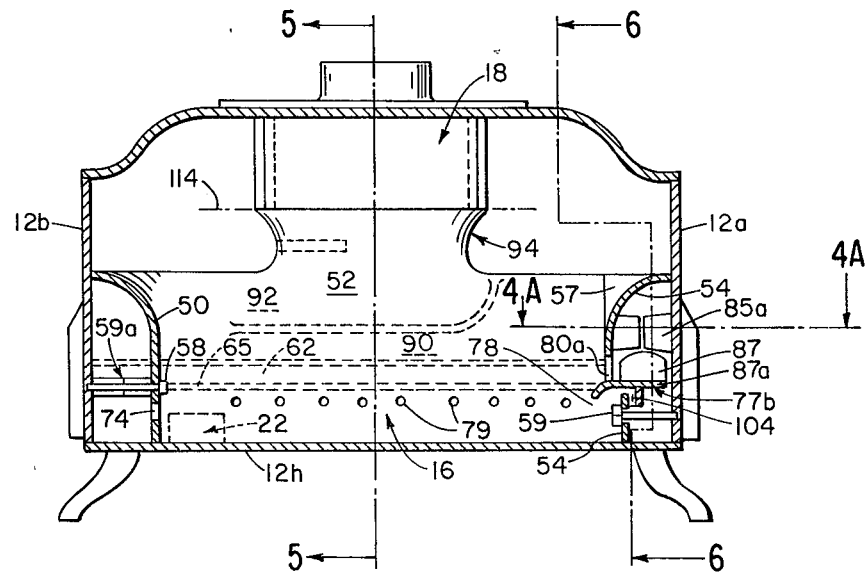
FIG. 4 is a cross-sectional view through the center of the apparatus along the lines 4—4 of FIG. 1.

Referring to FIG. 3, the illustrated heating apparatus 8 has a removable, left wear plate 50, a removable fireback 52, and a removable right wear plate 54. Wear plates 50 and 54 and fireback 52 are supported by bottom panel 12h and are contoured so that the wear plates and fireback 52 engage along seams 56, 57 in a substantially airtight fit. Wear plates 50, 54 thus prevent lateral movement of the fireback away from its engaging contact with back panel 12f as described in more detail below. The longitudinal position of the wear plates with respect to the side panels is fixed by screw connections 58, 59 (FIG. 4). A support member 59a attached to wear plate 50 engages a boss 59b of side wall 12b to prevent excessive tightening force at screw connections 58 from destructively damaging or distorting the wear plate. A corresponding structure employing member 59c from buffer plate 82a (FIG. 6) and a protruding member 59d from wear plate 54 prevent distortion of plate 54.

Wear plates 50 and 54 and fireback 52 are removable from the interior of the apparatus 8 through the front opening. These elements are more subject to deterioration because of their close proximity to the intense heat in the primary combustion chamber 16. They may therefore be replaced by the user without having to disassemble the entire stove frame member 10. In addition wear plates 50 and 54 and fireback 52 help protect the outside frame walls of the heating apparatus from undue wear resulting from exposure to the primary combustion chamber heat.

Wear plates 50 and 54 and fireback 52, in combination with side walls 12a and 12b and back wall 12f delimit the space in which a primary air supply path 60, a primary/secondary air supply path 61, a night air supply path 62, and a circuitous, combusted products flame path 64 are defined. The primary air supply path 60 and the primary/secondary air supply path 61 each begin at the thermostatically controlled inlet port 22. Air entering through port 22 thus divides at the enclosure side of the port into the two paths 60 and 61. The primary air supply path 60 passes, in the illustrated embodiment to a left side of the heating apparatus 8 and enters the primary combustion chamber 16 through a tapered slot 74 in wear plate 50. The slot is tapered to provide a desired air flow rate across the entire length of the slot and has a wider opening toward the back of the apparatus. The primary path through which these primary gases are directed is defined by wear plate 50 and a portion of fireback 52, in combination with the outside wall panels of the heating apparatus and a horizontal baffle member 65 (described in connection with FIG. 5). The primary/secondary air supply gases from air inlet port 22 are directed toward the right hand portion of the apparatus through a bottom elongated enclosure 77 (FIG. 5) formed by fireback 52 in combination with the rear panel 12f and the horizontal baffle member 65. This directed air path "turns the corner" at the back, right hand portion 77a of the apparatus and is directed beneath a multiple baffle plate 77b through a slot 78 into the primary combustion chamber 16.

The oxygen rich air directed from inlet 22 to primary/secondary path 61 serves two functions. A first portion of the air exits from path 61 through holes 79 in fireback 52. These oxygen rich preheated gases (heated by contact with the fireback) contribute to primary combustion in the primary combustion chamber 16. The remaining preheated, oxygen rich gases, which turn corner 77a, pass into the primary combustion chamber where they substantially immediately combine and mix with combusted gases 80 which are exiting through wear plate exhaust slot 80a. Slots 78 and 80a are thus formed by dividing the aperture in wear plate 54 by plate 87a. Thereby, a portion of the primary conbustion chamber 16 adjacent the slot opening 78 in wear plate 54 becomes, in effect, a secondary combustion chamber. The combusted gases exiting through openings 80a are controlled in part by baffles 83, 84, 85 of wear plates 54, three corresponding baffles 83a, 84a, 85a integral with side 12a and baffles 86, 87 of baffle plate 77b (as described below), and are guided along the long circuitous internal flame path 64 to an exit aperture 88 in the frame structure.

Figure 4A:
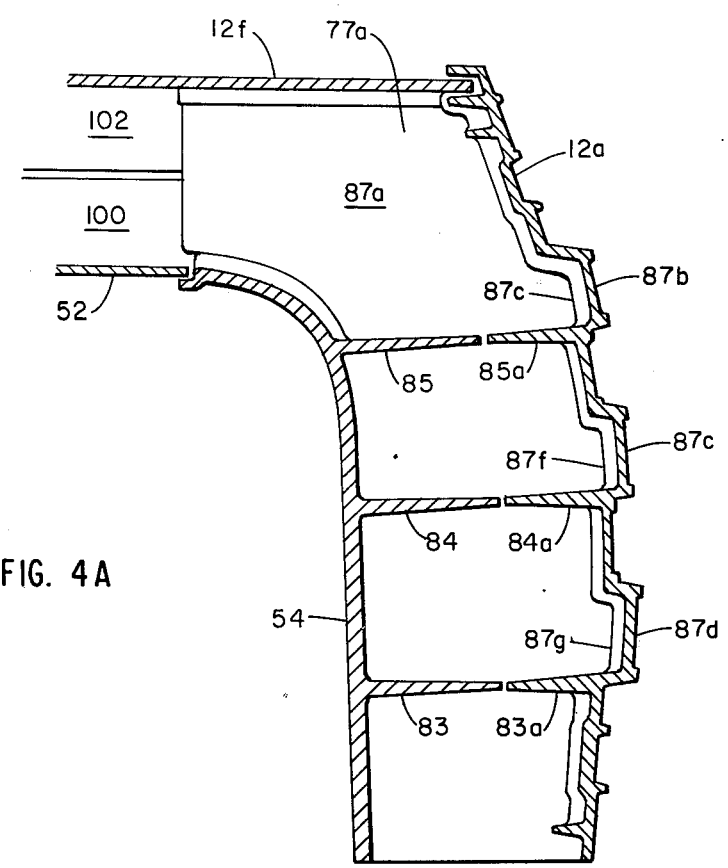
FIG. 4A is a cross-sectional view along the lines 4A—4A of FIG. 4.

As the combusted gases 80 exit through slot 80a, their natural tendency is to bunch together and impinge directly upon side wall 12a. This effectively concentrates the heat of the combusted gases on side wall 12a and, at the area of impingement, can turn the wall a cherry red color. Possible deterioration and breakage of wall 12a can follow. This is due to the close proximity of wall 12a and wear plate 54. To better channel the gases across the entire length of the slot 80a, to provide more uniform heating throughout the volume between wear plate 54 and side wall 12a, and to avoid overheating, the baffle system comprising baffles 83, 84, 85, 86, 87 and the three baffles integral with side wall 12a, is provided. The height of these baffles above plate 87a, is proportional to the expected exhaust flow around the baffle. In addition, outward projections 87b, 87c, 87d (FIG. 4A) provide voids on pockets 87e, 87f, 87g of stagnant air which effectively provide a boundary air layer which insulates the hottest portion of the exhaust gases from impinging directly upon side wall 12a. This structure effectively eliminates the concentration of gases against and hence possible overheating of side wall 12a.

The long internal flame path which begins substantially at slot 80a of wear plate 54 directs the combusted gases exiting chamber 16 back around the corner 77a, along a first left hand directed lower path 90, to a second right hand directed upper path 92, and then upward behind a cup shaped member portion 94, of fireback 50, past damper 18 and through the flue collar 96 to an exhaust pipe not shown. The flue collar connection enables the collar 96 to provide either a rear exiting or a top exiting configuration. The elements which define upper and lower paths 90, 92 are baffle members 100, 101, and 102 (FIG. 5) formed by mating elements from the rear panel 12f and fireback 52. These elements provide the substantially sealing relationship to guide the gaseous products of combustion along the flame path to the cup shaped member 94. The cooperating structure of the damper 18, cup shaped member 94, and the exit opening 88 is described in detail further below.

The night air supply path 62 extends from inlet port 35 in side 12b, across the back of the stove, and around corner 77a to slot 78. This path is directed to a portion of slot 78 below plate 87a and terminates after about one inch of travel (in the illustrated embodiment) along the lower side of baffle plate 87a. The night supply path, defined substantially by baffle elements 65, 102 and upwardly turned member 104 (FIGS. 4, 5, and 6), enables a low level of operation to take place, for example, when damper 28 is closed.

The heating apparatus thus far has been described and depicted operating in the horizontal combustion mode wherein combusted gases exit through the long internal flame path past a vertically positioned damper 18 to an exit aperture 88. The apparatus 8, according to the invention, however, is designed to be both a horizontal combustion apparatus wherein the damper 18 is in a substantially vertical position as shown in FIG. 3, and also an updraft combustion apparatus (i.e. a fireplace) in which damper 18 is pivoted about a longitudinal pivot axis 114 (FIGS. 4, 5, and 6) so that the main plate element 116 pivots downward to a substantially horizontal position as shown in dotted outline in FIGS. 7 and 8. This capability of operating in either an updraft or a horizontal combustion mode requires that the apparatus be structured to provide a sealing relationship between the damper and the flame path in the horizontal combustion mode of operation so that gases from the primary combustion chamber are blocked from exiting the apparatus directly through exit aperture 88; that is they must exit through the circuitous flame path. Similarly, in the updraft combustion mode of operation, the apparatus structure provides a substantially sealing relationship with a now horizontally directed damper to prevent gases from the circuitous flame path from exiting through exit aperture 88.

Referring now to FIGS. 7, 8, and 9, the damper 18 is designed to be removable from the apparatus without dismantling the frame. Thus the damper does not extend the full width of the apparatus. Damper 18 has the main pivoting panel member 116 and ear panel members 120, 122. The damper 18 and top and back frame panels are thus designed so that in its extreme positions, the damper engages other elements of the apparatus to provide the desired sealing relationships when the damper is vertical or horizontal (as described in more detail below).

The position of damper 18 is controlled by an articulated linkage 124 (FIG. 9) which provides, in combination with damper 18, a resistance against movement of the damper in the horizontal combustion mode (damper vertical). Referring to FIG. 9, the linkage has two elements, the handle member 20 and a link member 26 connected between end portion 128 of handle 20 and damper 18. The connection of the link member provide freely pivoting motion between the link and both the handle and the damper.

A pivotal connection 129 is provided at the damper by a retaining nut 129a threaded onto a right angle bent portion of link 126. The bent portion passes through damper ear member 120 along a pivot axis parallel to the damper pivot axis 114. The connection at end portion 128 is made, in the illustrated embodiment, by passing a U-shaped end of handle 20 through an eye 129b of link 126. Other connecting structures could be employed. Handle 20 is structured to pass through an opening 129c in rear panel 12f (sealed by protruding member 132) and is supported by the rear panel by capture hardware 129d. Illustrated portion 129e of handle 20 thus rotates on an axis parallel to the damper pivot axis 114.

Damper 18 is limited in its downward movement (to the horizontal operating position) by a protruding member 130 (FIG. 8) and in the horizontal position the damper panel 116 rests on and is supported by member 130. Upward movement of damper 18 (to the vertical position) is limited by engaging contact of damper flanges 130a, 130b (FIG. 9) with corresponding inwardly directed plate protrusions 132, 134. In reaching the vertical position, link 126 and handle end portion 128 pass an aligned position, wherein they are substantially parallel, so that thereafter, movement urged by damper 18, from the vertical position is resisted by engagement of end portion 128 with the protruding member 135.

The unique damper construction advantageously uses the minimal volume available in a stove wherein a vertical or a horizontal flue gas exit can be employed and wherein the damper in intended to be removable. A full width damper construction which might typically hinge or penetrate in the main frame members undesirably wastes available space in the primary combustion chamber and further does not provide a damper element which is easily removable without dismantling the frame. By providing a reduced width damper, however, in a stove which provides both a rear exiting as well as a top exiting flue gas exit capability, the damper panel 116 must be moved inward, from an otherwise normal position (wherein, in the horizontal position, it blocks the flame path and in the vertical position it seats adjacent protruding section 131a of back panel 12f) toward the front of the stove. This movement provides clearance for the flue collar in its top exiting state. However, in this configuration, inwardly directed plate protrusions 132, 134 must be provided, but these protrusions preferably do not extend inwardly for the full height of panel 116; protrusions 132, 134 are cut away from panel 116 as shown, so that in the updraft mode of combustion (damper in the horizontal position), combusted gas does not stagnate in the rear upper corners of the stove. When portions of protrusions 132, 134 are removed, however, the ears 120, 122 must be added to panel element 116 to maintain a sealing relationship when the damper is in a vertical position. Furthermore, the curvature at the top ear members 120, 122, required to pivot the damper, necessitates downward protrusions (only one downward protrusion 136 is shown) from top panel 12g. Thus, the combined requirements of updraft and horizontal combustion with a rear or top exiting flue collar and a removable damper, in the illustrated heating apparatus of restricted size, require a unique design concept for the cast iron damper.

The protrusions 132, 134, in combination with cup-shaped member 94, according to the preferred embodiment of the invention, capture the damper in a pivoting position. Damper pin protrusions (only pin 140 can be seen in FIGS. 7 and 8) extending from ear members 120, 122 are captured at the upper surface of cup-shaped portion 94 of fireback 52. The pins thus define the longitudinal axis 114 about which the damper rotates.

Other embodiments of the invention, including additions, subtractions, deletions, and other modifications of the preferred disclosed embodiment, will be obvious to those practiced in the art and are within the scope of the following claims.

What is claimed is:

1. A wood burning heating apparatus for operating in either a horizontal combustion mode or an updraft combustion mode comprising
    a heat conducting frame member having front, side, and back vertical wall panels, a top panel, and a bottom panel for enclosing a defined volume,
    a removable fireback,
    a plurality of removable wear plates for defining in combination with said fireback and said wall panels a primary air supply path, and a long circuitous internal flame path,
    said primary air supply path having a first enclosed elongated path for supplying air at a first side of the apparatus to a primary combustion chamber,
    said long flame path circuitously extending from a second side of said apparatus substantially between said fireback and at least one wear plate, and said frame member, to a top back portion of said apparatus,
    said frame member having a flue gas exit aperture for said flame path,
    a flue collar, able to engage said frame member at said exit aperture,
    a moveable damper pivotable about an axis for providing in a first position an updraft combustion apparatus and in a second position a horizontal combustion apparatus,
    means for moving said damper between said first and second positions, and
    said damper extending less than the full width of said apparatus.

2. The heating apparatus of claim 1 wherein
    said flue collar cooperates with said frame for providing in one position a top exiting flue path and in a second position a rear exiting flue path,
    said damper comprises
        a first panel member which pivots about a pivot axis between a substantially vertical position and a substantially horizontal position, and
        first and second ear panel members, integrally connected to said first panel member in spaced apart substantially vertical planes and pivoting about said pivot axis in said planes,
    said back wall panel has at least two protruding member,
    said fireback comprises a cup-shaped inwardly protruding section, said section meeting in sealing engagement with said protruding members of said back wall panel for directing gaseous flow from said flame path toward said exit opening, and
    said cup-shaped section, said protruding members, said frame member, and said damper forming sealing relationships when the damper is in said first and said second positions.

3. The heating apparatus of claim 2 wherein said protruding members each have cut-away side portions for providing more complete gaseous removal from upper back corners of said apparatus when the damper is in the first position.

4. The heating apparatus of claim 1 further comprising means for rendering said damper removable from the apparatus, wherein said damper can be removed without dismantling said frame member.

5. The heating apparatus of claim 1 wherein said means for moving said damper comprises
    an articulated linkage for providing a mechanical resistance against movement of the damper as a result of impinging combusted gases in at least the second position of the damper.

6. The heating apparatus of claim 1 wherein said protruding members and said cup-shaped section further comprise means for capturing said damper for said pivoting movement.

7. A wood burning heating apparatus comprising
    a heat conducting frame member having front, back, and side vertical wall panels, a top panel, and a bottom panel for enclosing a defined volume,
    a fireback,
    means for providing an air supply path and a combustion products exit flame path for operating said wood burning apparatus in a horizontal combustion mode,
    baffle means at a beginning of said combusted products exit flame path comprising
    a plurality of substantially vertically oriented, spaced apart baffle members for reducing the concentration of exiting combusted gases impinging upon a portion of said frame member,
    said flame path circuitously extending from said combusted products exit path beginning to an exit aperture, and
    a moveable damper pivotable about an axis for providing in a first position, an updraft combustion apparatus and in a second position a horizontal combustion apparatus.

8. A wood burning heating apparatus comprising
    a heat conducting frame member having a plurality of vertical wall panels, a top panel, and a bottom panel for enclosing a defined volume,
    a substantially vertically oriented fireback,
    a plurality of wear plates for defining in combustion with said fireback and said wall panels a primary air supply path and a long circuitous internal flame path,
    said primary air supply path having a first enclosed elongated path for supplying air at a first side of the apparatus to a primary combustion chamber, said long flame path circuitously extending from a second side of said apparatus, substantially between said fireback and at least one wear plate, and said frame member, to a back upper portion of said apparatus, said frame member having a flue gas exit aperture for said flame path, a damper pivotable about an axis for providing in a first position an updraft combustion apparatus and in a second position a horizontal combustion apparatus, means for moving said damper between said first and second positions, and a combusted gas baffle assembly for diffusing the flow of combusted gas exiting the primary combustion chamber, whereby a concentrated heating of a side wall panel of said frame member is avoided.

9. The heating apparatus of claim 8 wherein said baffle assembly comprises
 a plurality of spaced apart substantially vertical members, at least one of said members being connected to a said wear plate, and
 said wear plate connected baffle member having a cross-sectional area which varies according to the volume of gases passing therearound.

10. The heating apparatus according to claim 9 further comprising
 a secondary air supply path extending between a said wear plate, said fireback, and said frame member,
 said secondary air supply path having an enclosed elongated path for supplying air at said second end of said apparatus,
 a baffle plate at said second end of said apparatus between a said wear plate and a said side wall panel,
 said baffle plate having a substantially horizontal member for guiding, in combination with the bottom of said heating apparatus, said secondary air to said primary combustion chamber.

11. The heating apparatus of claim 1 wherein each of said wear plates comprises a tapered slot for providing substantially even air flow to said primary combustion chamber along the length of said slot.

12. The heating apparatus of claim 1 further comprising lateral support elements positioned between the wear plates and the frame member for supporting said wear plates against distorting lateral pressures.

13. A wood burning heating apparatus comprising
 a heat conducting frame member having front, back, and side vertical wall panels, a top panel, and a bottom panel for enclosing a defined volume,
 a removable fireback,
 a plurality of removable wear plates for defining in combination with said fireback and said wall panels a primary air supply path, and a long circuitous internal flame path,
 said primary air supply path having a first enclosed enlongated path for supplying air at a first side of the apparatus to a primary combustion chamber,
 said long flame path circuitously extending from a second side of said apparatus substantially between said fireback and at least one wear plate, and said frame member, to a top back portion of said apparatus,
 said top panel and said back wall panel at a back position of said apparatus adapted to cooperatively define a flue gas exit aperture for said flame path,
 a flue collar, able to engage said frame member at said exit aperture to provide in one position a top exiting flue path and in a second position a rear exiting flue path,
 a removable damper pivotable about an axis for providing in a first position an updraft combustion apparatus and in a second position a horizontal combustion apparatus, said damper able to be removed without dismantling said frame member,
 means for moving said damper between said first and second positions, and
 said damper extending less than the full width of said apparatus and cooperating with said rear panel for providing a sealing relationship therewith.

14. The heating apparatus of claim 13 wherein said said damper comprises
 a first panel member which pivots about a pivot axis between a substantially vertical position and a substantially horizontal position, and
 first and second ear panel members, integrally connected to said first panel member in spaced apart substantially vertical planes and pivoting about said pivot axis in said planes,
 said fireback comprises a cup-shaped inwardly protruding section, said section meeting in sealing engagement with members protruding from said back wall panel for directing gaseous flow from said flame path toward said exit opening, and
 said cup-shaped section, said protruding members, said frame member, and said damper forming sealing relationships when the damper is in said first and said second positions.

15. The heating apparatus of claim 14 wherein each said protruding member has a cut-away side portion for providing more complete gaseous removal from an upper back corner of said apparatus when the damper is in the first position.

16. The heating apparatus of claim 13 wherein said means for moving said damper comprises
 an articulated linkage for providing a mechanical resistance against movement of the damper as a result of impinging combusted gases in at least the second position of the damper.

17. A wood burning heating apparatus for operating in either a horizontal combustion mode or an updraft combustion mode comprising
 a heat conducting frame member having front, side, and back wall panels, a top panel, and a bottom panel for enclosing a defined volume,
 a removable fireback,
 a plurality of removable wear plates for defining in combination with said fireback and said wall panels a primary air supply path, a night air supply path, and a long circuitous internal flame path,
 said primary air supply path having a first enclosed elongated path for supplying air at a first side of the apparatus to a primary combustion chamber,
 said night air supply path having a second enclosed path for supplying air at a second side of said apparatus through a limited portion of a tapered slot in the wear plate at said second side,
 said long flame path circuitously extending from said second side of said apparatus substantially between said fireback and said second side wear plate, and said frame member, to a top back portion of said apparatus,
 said frame member having a flue gas exit aperture for said flame path, a flue collar, able to engage said frame member at said exit aperture, a moveable damper pivotable about an axis for providing in a first position an updraft combustion apparatus and in a second position a horizontal combustion apparatus, means for moving said damper between said first and second positions, and said damper extending less than the full width of said apparatus.

18. The heating apparatus according to claim 17 further comprising a secondary air supply path extending between a said wear plate, said fireback, and said frame member, said secondary air supply path having an enclosed elongated path for supplying air at said second end of said apparatus through said tapered slot, a baffle plate at said second end of said apparatus between a said wear plate and a said side wall panel, said baffle plate having a substantially horizontal member for guiding, in combination with the bottom of said heating apparatus, said secondary air to said primary combustion chamber, and said baffle plate further having integral baffle elements cooperatively adapted with baffle elements integral with said second side wear plate for defining said night air supply path at an end of said path near said slot.

19. A wood burning heating apparatus for operating in either a horizontal combustion mode or an updraft combustion mode comprising a heat conducting frame member having front, side, and back vertical wall panels, a top panel, and a bottom panel for enclosing a defined volume, a fireback, a plurality of wear plates for defining in combustion with said fireback and said wall panels a primary air supply path, and a long circuitous internal flame path, said primary air supply path having a first enclosed elongated path for supplying air at a first side of the apparatus to a primary combustion chamber, said long flame path circuitously extending from a second side of said apparatus substantially between said fireback and at least one wear plate, and said frame member, to a top back portion of said apparatus, said frame member having a flue gas exit aperture for said flame path, a flue collar, able to engage said frame member at said exit aperture, a moveable damper pivotable about an axis for providing in a first position an updraft combustion apparatus and in a second position a horizontal combustion apparatus, and an articulated linkage for moving said damper between said first and second positions, said linkage having a handle member supported by said frame member for pivotal movement about a handle axis, a link member pivotally connected between said damper and an end portion of said handle, whereby movement of said handle to a first rotational position moves said damper to said first position and movement of said handle to said second rotation position moves said damper to said second position.

20. The heating apparatus according to claim 19 wherein said link member connects to said damper through a pivoting connection having a pivot axis parallel to said damper pivot axis, said handle member pivot axis is substantially parallel to said damper pivot axis, and a portion of said handle member and said link are substantially parallel to an aligned position intermediate when said handle member is moved from said first rotation position to said second rotation position.

* * * * *

UNITED STATES PATENT AND TRADEMARK OFFICE
CERTIFICATE OF CORRECTION

PATENT NO. : 4,279,238
DATED : July 21, 1981
INVENTOR(S) : Duncan C. Syme

It is certified that error appears in the above-identified patent and that said Letters Patent are hereby corrected as shown below:

Column 4, line 52, "plates" should be --plate--.

Column 6, line 14, "26" should be --126--.

In the claims:

Claim 8, column 8, line 62, "combustion" should be --combination--.

Claim 13, column 9, line 59, "enlongated" should be --elongated--.

Claim 17, column 10, line 48, insert --vertical-- after "back".

Claim 19, column 11, line 38, "combustion" should be --combination--.

Signed and Sealed this

Twenty-second Day of September 1981

[SEAL]

Attest:

Attesting Officer

GERALD J. MOSSINGHOFF

Commissioner of Patents and Trademarks